United States Patent
Wong et al.

(10) Patent No.: US 10,677,664 B1
(45) Date of Patent: Jun. 9, 2020

(54) SINGLE-TEMPERATURE-POINT TEMPERATURE SENSOR SENSITIVITY CALIBRATION

(71) Applicant: Hong Kong Applied Science and Technology Research Institute Company, Limited, Hong Kong (HK)

(72) Inventors: Chun Fai Wong, Hong Kong (HK); Tai Yin Wong, Hong Kong (HK); Guangjie Cai, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 16/416,390

(22) Filed: May 20, 2019

(51) Int. Cl.
*G01K 15/00* (2006.01)
(52) U.S. Cl.
CPC .................. *G01K 15/005* (2013.01)
(58) Field of Classification Search
CPC .... G01K 15/00; G01K 15/002; G01K 15/005; G01K 15/007
See application file for complete search history.

(56) References Cited

U.S. PATENT DOCUMENTS

| | | | | |
|---|---|---|---|---|
| 5,444,219 A | * | 8/1995 | Kelly | G01K 3/14 219/505 |
| 6,217,213 B1 | * | 4/2001 | Curry | G01K 1/028 374/178 |
| 6,342,997 B1 | * | 1/2002 | Khadkikar | G01K 3/005 361/100 |
| 7,204,638 B2 | | 4/2007 | Hsu | |
| 7,461,972 B2 | | 12/2008 | Cohen | |

(Continued)

FOREIGN PATENT DOCUMENTS

| | | |
|---|---|---|
| CN | 102778304 A | 11/2012 |
| CN | 103245435 A | 8/2013 |

(Continued)

OTHER PUBLICATIONS

ISR and Written Opinion, PCT/CN2019/088174, dated Feb. 24, 2020.

*Primary Examiner* — Lisa M Caputo
*Assistant Examiner* — Philip L Cotey
(74) *Attorney, Agent, or Firm* — gPatent LLC; Stuart T. Auvinen

(57) ABSTRACT

A single-temperature-point temperature-sensitivity sensor assumes that all sensitivity lines converge at absolute zero temperature, so during calibration measurement is needed at only one temperature. A sensor output voltage is generated by current from a mirrored current source flowing through a variable resistor. During calibration, the resistance of the variable resistor and the mirror ratio of the mirrored current source are adjusted. An error amplifier compares voltages generated by unit currents generated by unit current sources to adjust the unit current sources and the mirrored current source. Each unit current flows through a grounded-base PNP transistor. A switchable PNP transistor is in parallel with one of the grounded-base PNP transistors and has its base switched on and off to adjust the PNP current for two measurements. The difference between the two measurements is compared to a calibration target to adjust the variable resistor and mirror ratio during calibration at a single temperature.

20 Claims, 13 Drawing Sheets

(56) References Cited

U.S. PATENT DOCUMENTS

| | | | |
|---|---|---|---|
| 7,552,022 B2 | 6/2009 | Romier et al. | |
| 7,674,035 B2 | 3/2010 | Pertijs et al. | |
| 8,056,404 B2 | 11/2011 | Murase | |
| 8,864,377 B2 | 10/2014 | Wong et al. | |
| 9,182,295 B1* | 11/2015 | Perrott | G01K 7/226 |
| 9,638,584 B2 | 5/2017 | Wong et al. | |
| 9,804,036 B2 | 10/2017 | Ma | |
| 10,175,119 B1 | 1/2019 | Perrott et al. | |
| 10,333,047 B2* | 6/2019 | Gilbert | G01L 21/12 |
| 2006/0202821 A1* | 9/2006 | Cohen | G01K 1/024 340/539.27 |
| 2006/0262827 A1* | 11/2006 | Hsu | G01K 7/01 374/1 |
| 2007/0195858 A1* | 8/2007 | Romier | G01K 15/002 374/163 |
| 2008/0069176 A1* | 3/2008 | Pertijs | G01K 7/01 374/1 |
| 2011/0138874 A1* | 6/2011 | Murase | F02D 41/123 73/1.06 |
| 2011/0268151 A1* | 11/2011 | Hadwen | B01L 3/502792 374/141 |
| 2013/0235903 A1* | 9/2013 | Wong | H01L 35/32 374/178 |
| 2015/0369674 A1* | 12/2015 | Ma | G01K 7/015 374/1 |

FOREIGN PATENT DOCUMENTS

| | | |
|---|---|---|
| CN | 103528714 | 1/2014 |
| CN | 105352630 A | 2/2016 |
| CN | 103528714 B | 11/2016 |
| CN | 207268657 U | 4/2018 |
| JP | 2010091412 A | 4/2010 |

* cited by examiner

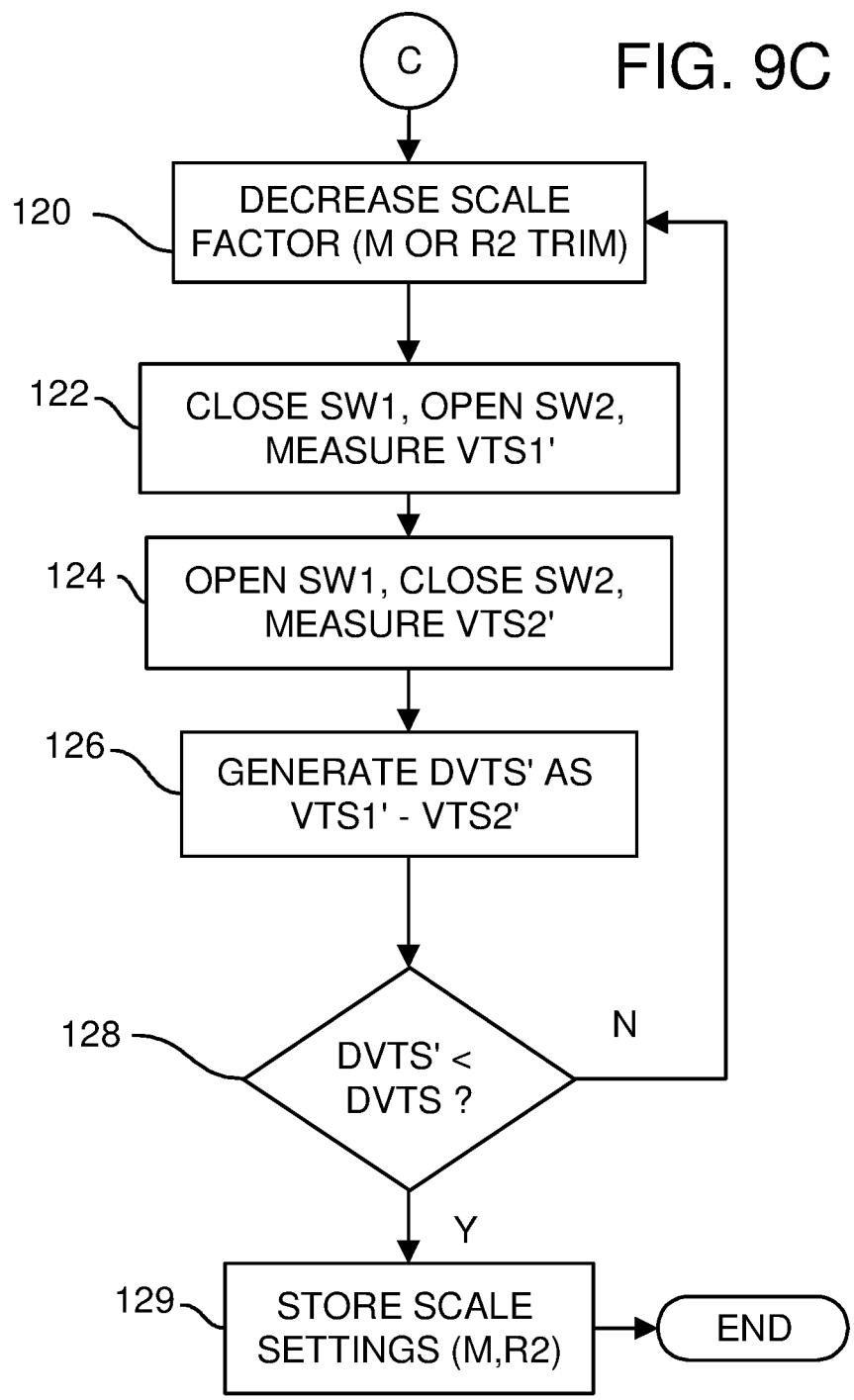

SINGLE-TEMPERATURE-POINT TEMPERATURE SENSOR SENSITIVITY CALIBRATION

FIELD OF THE INVENTION

This invention relates to on-chip temperature-sensor circuits, and more particularly to single-temperature-point sensor circuits.

BACKGROUND OF THE INVENTION

Integrated Circuit (IC's) can include thousands or millions of transistors on a single chip. Operation of these transistors can generate significant heat in a small area. Hotspots can develop that can damage the IC device.

The temperature of the IC device can be monitored by an on-chip temperature-sensor circuit. When the monitored temperature exceeds a limit, the IC device can be protected, such as by reducing operating frequency or by shutting down parts of the IC device. Once the IC device has cooled, the frequency can be increased again, or more parts of the IC device may be powered back up.

Temperature-sensor circuits have a temperature sensitivity that is the slope of a plot of the circuit's voltage vs. temperature (V/T). This temperature sensitivity can shift due to gain errors. Gain errors may be caused by device mismatch, layout mis-match, DC offsets, or other circuit characteristics.

During calibration, the temperature-sensor circuit's output voltage can be measured at two or more temperature points to establish a straight line in the voltage vs. temperature plot. The slope of the line, in volts per degree C., can be obtained and used during normal operation to determine the temperature shifts corresponding to sensor voltage changes.

Such two-temperature-point calibration is undesirable, since the circuit must be measured at two different temperatures during calibration. The IC device may have to be placed in a temperature-controlled chamber or otherwise heated or cooled to obtain the second temperature measurement. Such heating may require 10 or more minutes. Expensive test equipment may be occupied during this heating period, or the product testing line may need to be expanded, increasing test and manufacturing costs.

More recently, single-temperature-point calibration has been used to eliminate the heating delay time. One temperature point is assumed to be absolute zero (−273.15° C.) where the temperature sensor circuit produces some pre-computed offset. Since the voltage vs. temperature line is anchored at absolute zero, only one other temperature point is needed to establish the line's slope or sensitivity. Thus calibration requires measuring the output voltage of the temperature sensor circuit at only 1 temperature point. This measured temperature point can be at room temperature, eliminating the need for a temperature chamber during calibration.

However, single-point temperature sensor calibration often suffers from a relatively small temperature sensing output range. Sometimes the temperature sensitivity can be tuned only over a short range. DC offsets in the circuit can cause inaccurate sensitivity readings. Calibration errors can occur when the $2^{nd}$, measured temperature point is incorrectly estimated, which can occur when device mismatches occur in the temperature sensor circuit.

What is desired is a single temperature-point temperature sensor circuit. A calibration method that measures the sensor circuit's output at only one temperature is desired. A method to adjust the sensor circuit's temperature sensitivity over a wide range or temperatures is desired. A calibration method that cancels DC offsets in the temperature sensor circuit is desired.

BRIEF DESCRIPTION OF THE DRAWINGS

FIGS. 9A-9C are a flowchart of a calibration method for a single-temperature-point temperature sensor circuit.

DETAILED DESCRIPTION

The present invention relates to an improvement in single-temperature-point temperature sensor circuits. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
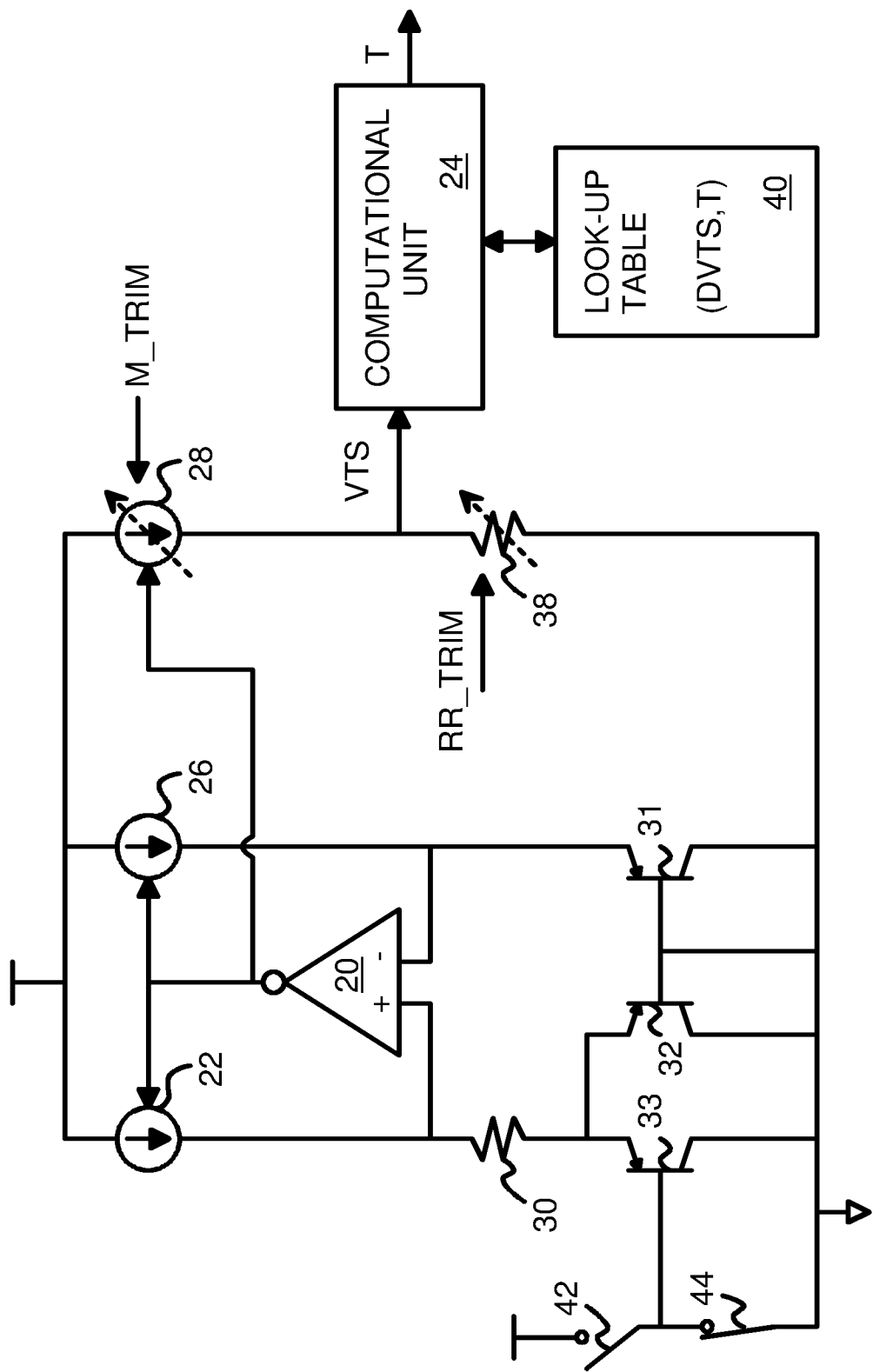
FIG. 1 is a schematic diagram of a single-temperature-point temperature sensor circuit.

FIG. 1 is a schematic diagram of a single-temperature-point temperature sensor circuit. Current sources 22, 26 have the same size and generate the same amount of current. The current generated by current source 26 flows through the emitter of PNP transistor 31 to its grounded collector, while the current generated by current source 22 flows through resistor 30 and then to the emitters of PNP transistors 32, 33 and to their grounded collectors. PNP transistors 32, 33 are connected in parallel but have separate base connections.

The bases of PNP transistors 31, 32 are grounded, so PNP transistors 31, 32 remain on and conduct current from emitter to collector during normal operation. However, the base of PNP transistor 33 is switched on and off by switches 42, 44. When switch 42 is open and switch 44 is closed, the base of PNP transistor 33 is grounded, and its emitter-to-base junction is forward biased, turning on PNP transistor 33. The current from current source 22 through resistor 30 is divided between PNP transistors 32, 33 that are connected in parallel.

When switch 42 is closed and switch 44 is open, the base of PNP transistor 33 is driven high by the power supply, and its emitter-to-base junction is reverse biased, turning off PNP transistor 33. All of the current from current source 22 through resistor 30 flows through PNP transistor 32, since PNP transistor 33 is turned off.

Only one of switches 42, 44 is closed at any time. Having at least one of switches 42, 44 open prevents a power-to-ground short.

Error amplifier 20 compares voltages created by current sources 22, 26 in each circuit leg. The voltage between current source 22 and resistor 30 is applied to the non-inverting (+) input of error amplifier 20, while the voltage between current source 26 and the emitter of PNP transistor 31 is applied to the inverting (−) input of error amplifier 20.

The output of error amplifier 20 is applied to control current sources 22, 26, 28. Current sources 22, 26 have identical sizes, but current source 28 is M times larger than current source 22. Thus the current from current source 22 is mirrored and scaled to a M-times larger current in mirrored current source 28. This larger current flows from current source 28 through variable resistor 38 to ground.

The M-times current through variable resistor 38 generates output temperature-sensing voltage VTS. Two measurements of VTS are made at the same temperature. Once measurement has PNP transistor 33 turned on, and the other measurement has PNP transistor 33 turned off.

The first measurement, VTS1, has switch 44 closed and switch 42 open, grounding the base of PNP transistor 33 and turning it on. Since both of PNP transistors 32, 33 are on, a higher current is pulled through resistor 30, increasing its I-R voltage drop and increasing the voltage on the +input of error amplifier 20, driving the output of error amplifier 20 higher. The higher output of error amplifier 20 increases the current drive of current sources 22, 26 to compensate. The output from error amplifier 20 causes mirrored current source 28 to produce more current. The larger M-times current through variable resistor 38 increases VTS1.

For the second measurement, VTS2, switch 44 is open and switch 42 is closed, driving high the base of PNP transistor 33 and turning it off. Since only PNP transistor 32 is on, a smaller current flows through resistor 30, reducing the voltage on the +input of error amplifier 20, reducing its output voltage, to the lower output voltage from error amplifier 20 causes current sources 22, 26, 28 to decrease currents to compensate. This also causes mirrored current source 28 to produce less current. The lower M-times current through variable resistor 38 lowers VTS2.

Computational unit 24 receives VTS and stored VTS as VTS1 when switch 44 is closed, or as VTS2 when switch 42 is closed. Computational unit 24 calculates the difference between VTS1 and VTS2 to obtain DVTS. During normal operation, DVTS is looked up in Look-Up Table (LUT) 40 to obtain the sensed temperature T.

During calibration, trim RR_TRIM for variable resistor 38 or trim M_TRIM for mirrored current source 28 is adjusted to adjust the measured DVTS to match a target value for DVTS.

Figure 2:
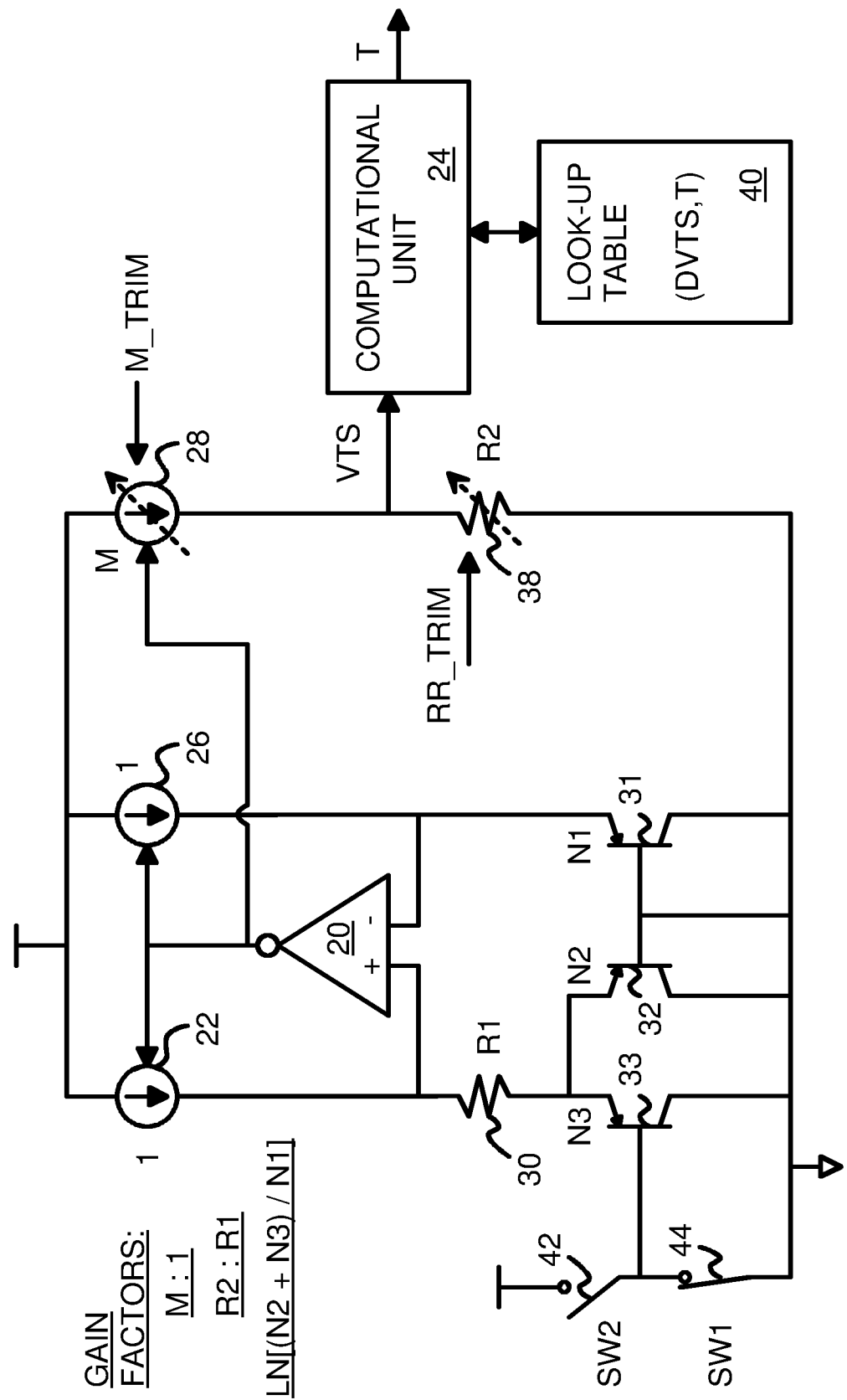
FIG. 2 is a schematic diagram of the single-temperature-point temperature sensor circuit highlighting the three scale factors.

FIG. 2 is a schematic diagram of the single-temperature-point temperature sensor circuit highlighting the three scale factors. The range of temperatures and sensitivities is improved by having three scale factors in the circuit. Mirrored current source 28 can be adjusted by trim signal M_TRIM to vary its current scaling factor M. Thus the value of M can be increased or decreased. Current sources 22, 26 each have a fixed current value of 1, so the current gain is M:1, where M is scalable by M_TRIM.

Likewise, variable resistor 38 can be adjusted by trim signal RR_TRIM to vary its resistance R2. Resistor 30 has a fixed resistance of R1, so the resistance gain factor is R2:R1, where R2 is scalable using trim RR_TRIM.

The currents through PNP transistors 31, 32, 33 cause output voltage VTS to vary as a function of their relative sizes N1, N2, N3 using a logarithmic function:

$$\ln[(N2+N3)/N1]$$

wherein ln is the natural logarithm. When PNP transistor 33 is turned off, the function is reduced to:

$$\ln[N2/N1].$$

Thus the gain of the temperature sensor circuit is adjustable three different ways. The current mirror factor M is scalable using M_TRIM. The resistor ratio R2:R1 is scaleable by adjusting mirrored current source 28 using RR_TRIM. Finally, PNP transistor 33 is switched on and off by switches 42, 44, causing the current through resistor 30 to toggle between two different values.

Having three gain adjustments allows for a much larger overall range of temperatures and of temperature sensitivity. A wide calibration range is provided.

While these gain factors are relatively independent of temperature, process, and supply voltage, device and layout mismatch errors can still occur. The bipolar devices, PNP transistors 31, 32, 33, tend to have good intrinsic matching, better than resistors or MOS devices.

Figure 3:
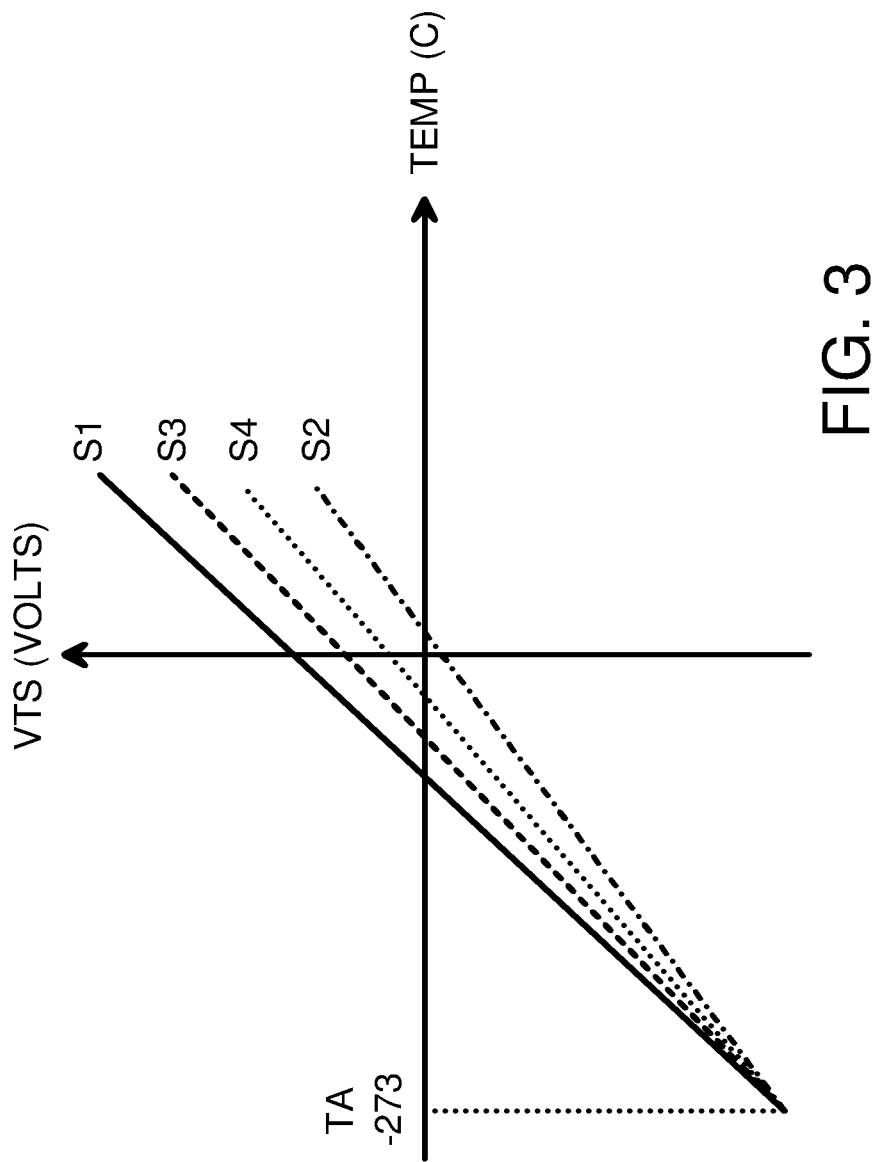
FIG. 3 is a graph highlighting various sensitivities to temperature.

FIG. 3 is a graph highlighting various sensitivities to temperature. The output voltage VTS of the temperature sensor is plotted as a function of temperature.

Mismatches in the sensor circuit and different values selected for the scaling factors cause different gains or slopes of lines S1, S2, S3, S4. All lines converge at absolute zero, −273.15° C., producing the same value of VTS. Different selections for the current-mirror trim M_TRIM, and for the resistor trim RR_TRIM cause different ones of lines S1, S2, S3, S4 to be selected. Also, turning PNP transistor 33 on or off with switches 42, 44 causes different lines to be selected. While four lines S1, S2, S3, S4 are shown, in actuality there are many such lines, each with a different slope, and all passing through the same point at absolute zero.

Figure 4:
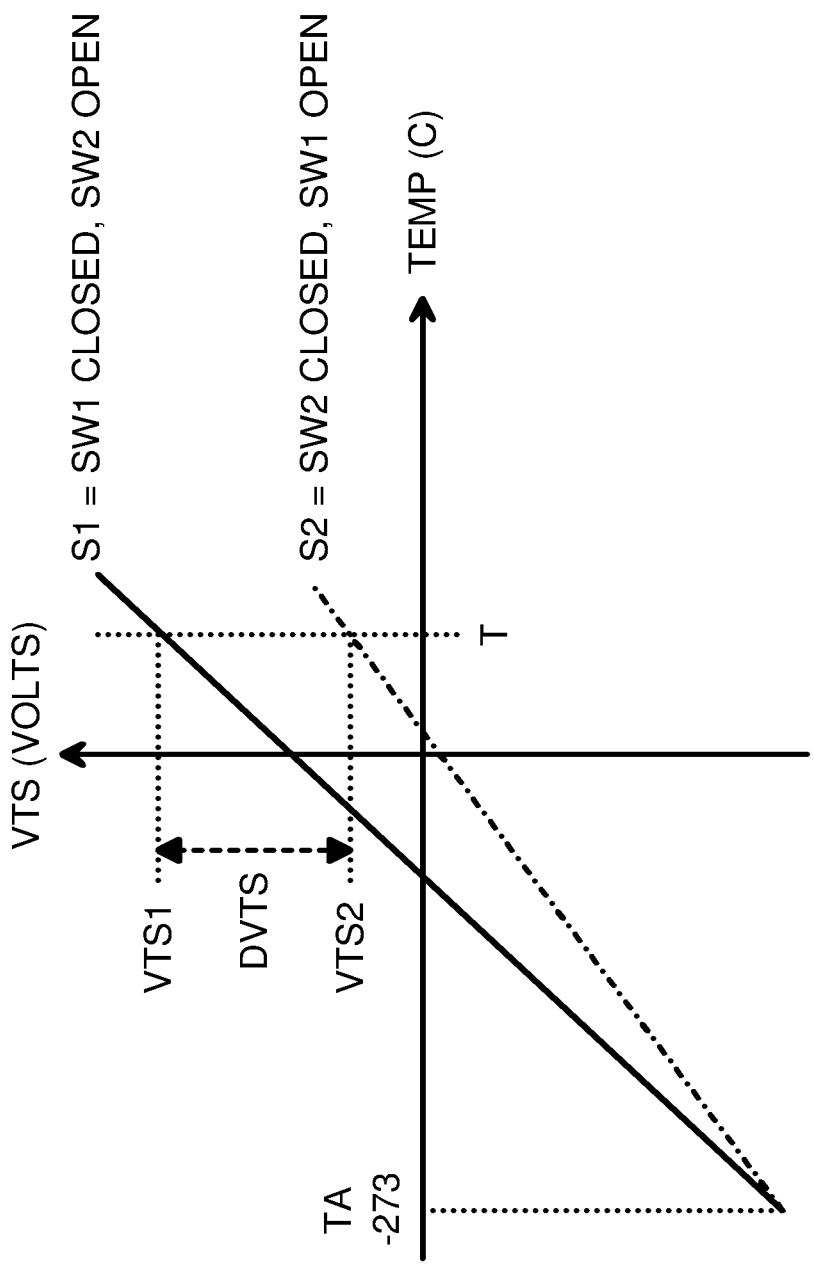
FIG. 4 shows how switching the PNP transistor on and off changes the temperature sensitivity line.

FIG. 4 shows how switching the PNP transistor on and off changes the temperature sensitivity line. When switch 44 SW1 is closed and switch 42 SW2 is open, PNP transistor 33 has its base connected to ground, turning on PNP transistor 33. The temperature sensitivity of the sensor circuit follows line S1.

When switch 44 SW1 is open and switch 42 SW2 is closed, PNP transistor 33 has its base connected to power, turning off PNP transistor 33. The temperature sensitivity of the sensor circuit follows line S2. Turning off PNP transistor 33 reduces the total current through resistor 30, reducing the +voltage to error amplifier 20, decreasing VTS. Thus line S2 is below line S1, where PNP transistor 33 is on.

During calibration, at a measurement temperature T, such as room temperature, when PNP transistor 33 is on, the sensor circuit operates along line S1. Temperature T crosses line S1 at voltage VTS1. During calibration, PNP transistor 33 is then turned off, causing the sensor circuit to now operate along line S2. Temperature T crosses line S2 at voltage VTS2. The difference between these two measurements, VTS1−VTS2, is DVTS. The difference DVTS has a different and unique value for each value of temperature T, since lines S1, S2 intersect at absolute zero.

Figure 5:
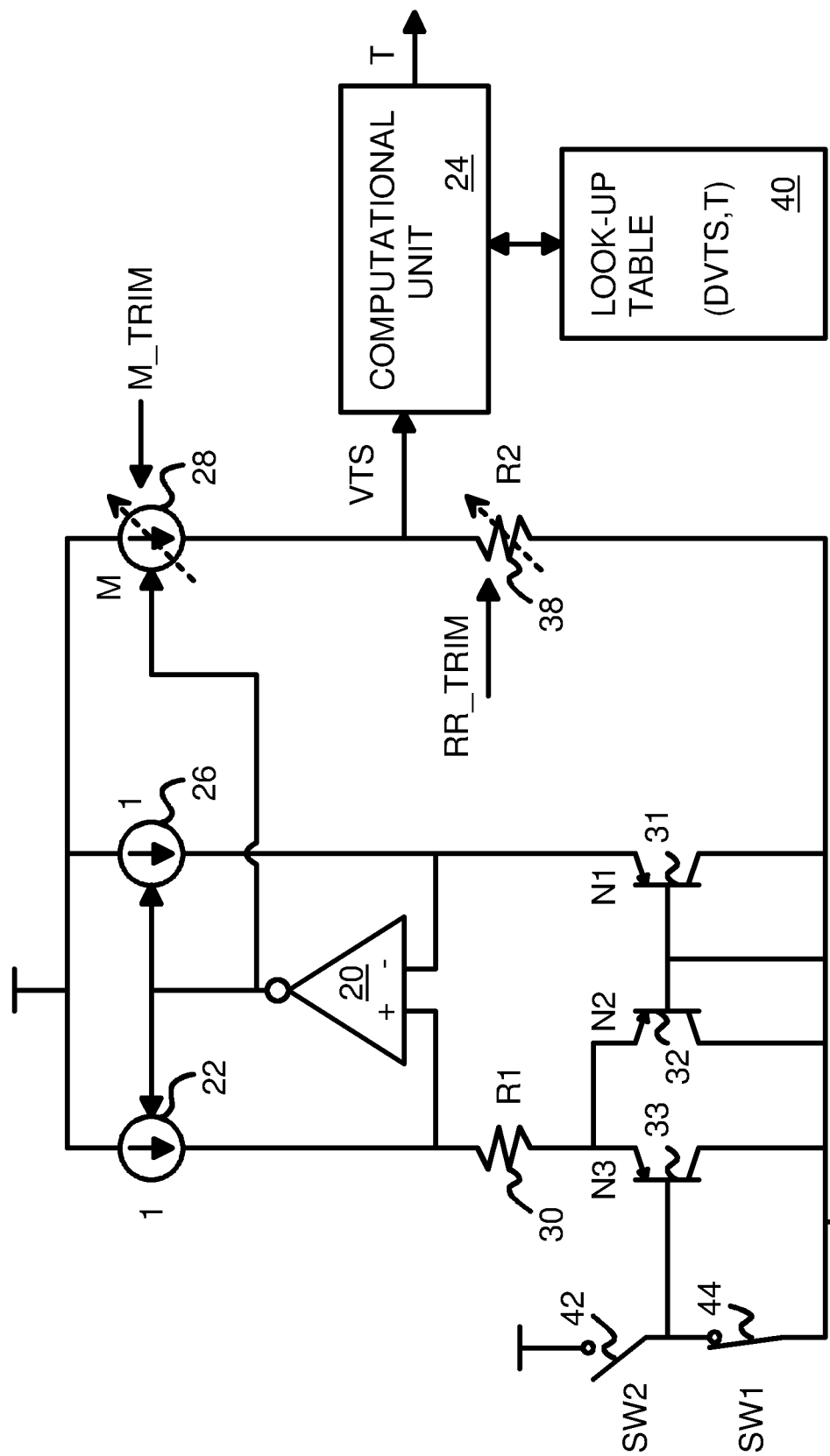
FIG. 5 highlights the first step in calibration.

FIG. 5 highlights the first step in calibration. Switch 44 SW1 is closed and switch 42 SW2 is open, driving ground to the base of PNP transistor 33. This grounded base provides a positive emitter-to-base pn junction voltage, turning on PNP transistor 33. The temperature sensitivity of the sensor circuit follows line S1. The measured sensor output voltage VTS1 is proportional to $$\ln[(N2+N3)/N1]$$

wherein ln is the natural logarithm, and N1, N2, and N3 are the relative sizes or current drives of PNP transistors 31, 32, 33, respectively.

Figure 6:
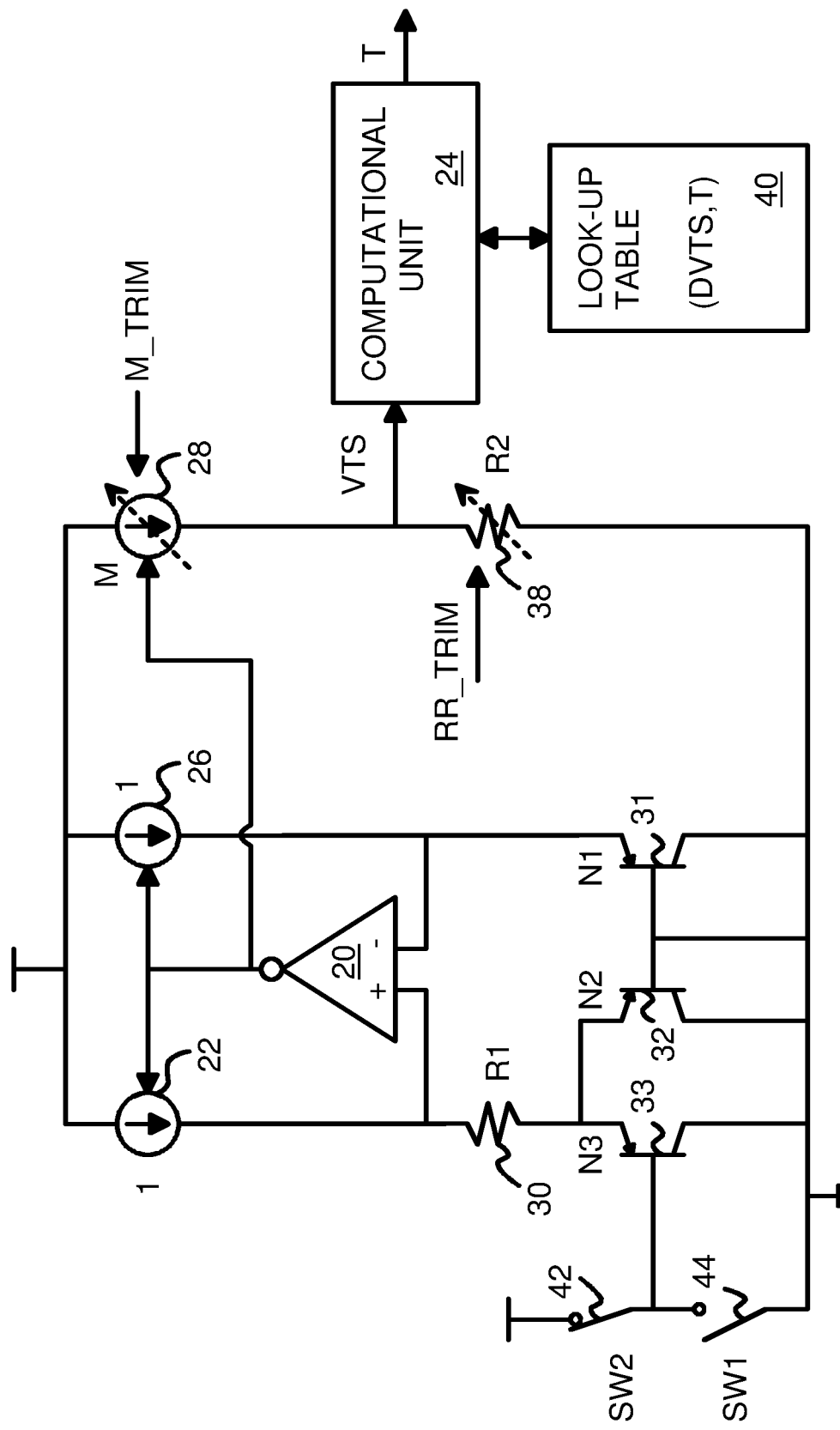
FIG. 6 highlights the second step in calibration.

FIG. 6 highlights the second step in calibration. Switch 44 SW1 is open and switch 42 SW2 is closed, driving the power supply voltage to the base of PNP transistor 33. This high-connected base provides a negative emitter-to-base pn junction voltage, turning off PNP transistor 33. All of the current from current source 22 must flow through PNP transistor 32.

The temperature sensitivity of the sensor circuit follows line S2. The measured sensor output voltage VTS2 is proportional to $$\ln[N2/N1].$$

Since N2 is always less than N2+N3, ln [N2/N1] will be a smaller value than ln [(N2+N3)/N1] at any temperature. Thus VTS1 is always greater than VTS2, when all other settings and environmental conditions are the same.

Figure 7:
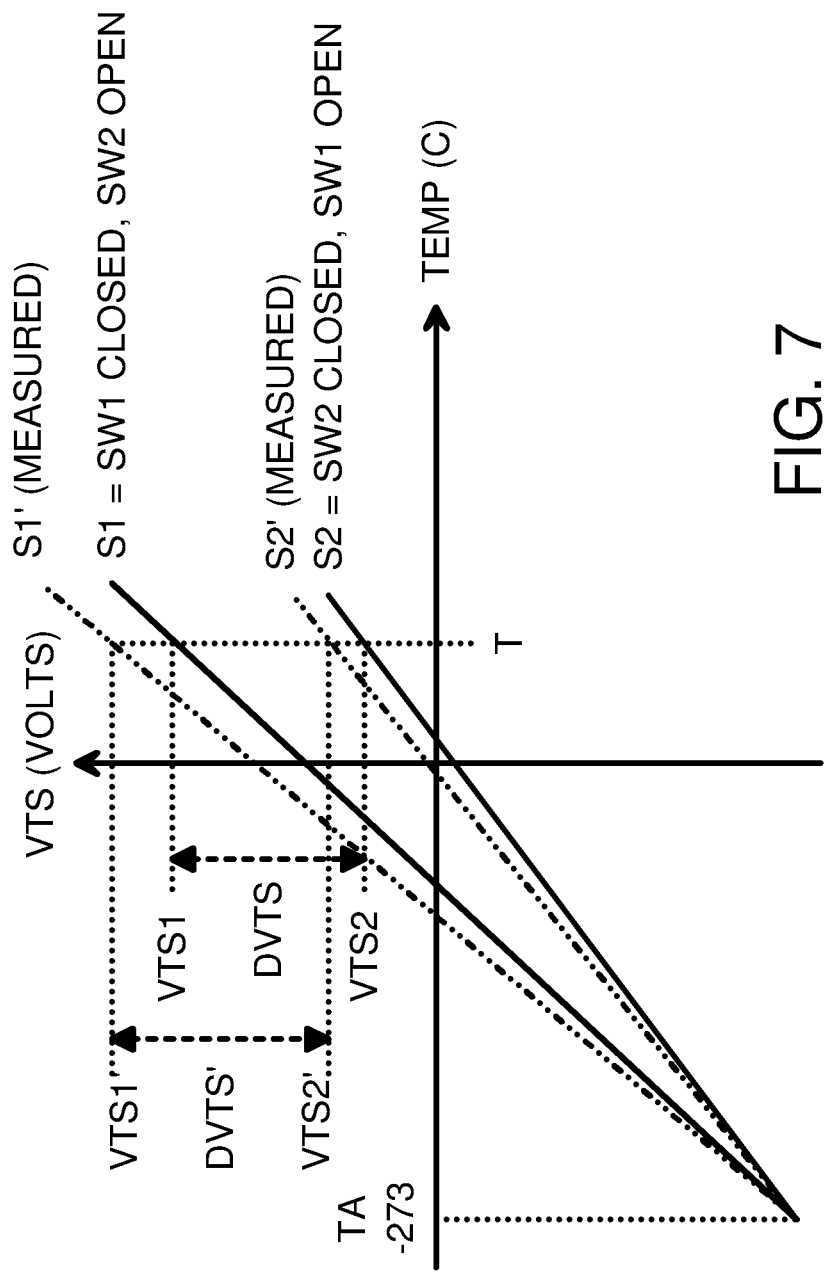
FIG. 7 highlights an out-of-calibration condition.

FIG. 7 highlights an out-of-calibration condition. Before calibration, the measured value VTS1' follows pre-calibrated line S1', which differs from ideal line S1 due to circuit mismatches or offsets. Likewise, the measured value VTS2' follows pre-calibrated line S2', which also differs from ideal line S2 due to circuit mismatches or offsets. The measured difference DVTS'=VTS1'−VTS2', is larger than the ideal difference DVTS=VTS1−VTS2.

The measured voltage difference DVTS' is a function of three gain factors, for the resistors, current mirror, and bipolar transistors:

$$(R2/R1)*M*\ln[(N2+N3)/N1]*(k/q)*T$$

wherein R2/R1 is the resistor gain factor, where R1 is the resistance of resistor 30 and R2 is the resistance of variable resistor 38 for the current trim setting of RR-TRIM, and M is the ratio of currents between mirrored current source 28 and current source 22, where M is adjusted by the current trim setting M_TRIM, and N1, N2, N3 are the relative sizes of PNP transistors 31, 32, 33, respectively, k is Boltzmann's constant, q is the electron charge constant, and T is the current temperature. By subtracting one measurement VTS2 from another measurement VTS1, any DC offset is cancelled out.

Figure 8:
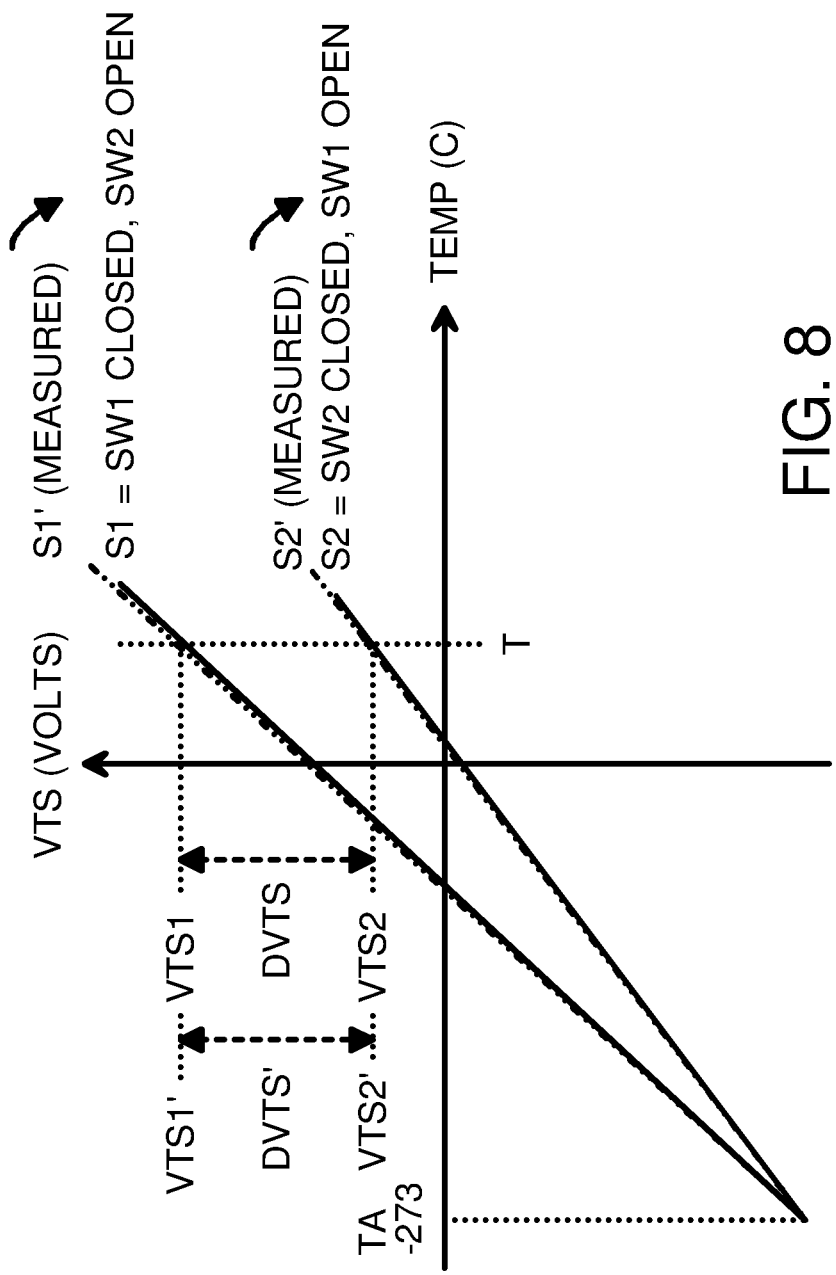
FIG. 8 highlights an in-calibration condition.

FIG. 8 highlights an in-calibration condition. During calibration, the trim values are adjusted to move measured line S1' closer to ideal line S1, and to move measured line S2' closer to ideal line S2. For example, the resistor trim RR_TRIM can be decreased to reduce the resistor ratio R2/R1 to compensate for the higher slope of measured lines S1', S2'. Measurements can be repeated and further trim adjustments made until the measured difference DVTS' matches the ideal difference DVTS. Calibration ends once the measured difference DVTS'=VTS1'−VTS2' matches the ideal difference DVTS=VTS1−VTS2. The matching can be within some tolerance, such as +/−5%, 10%, etc., or can be a trim setting, such as the closest trim setting to the ideal, or one of the two adjacent trim settings to the ideal value.

Figure 9A:
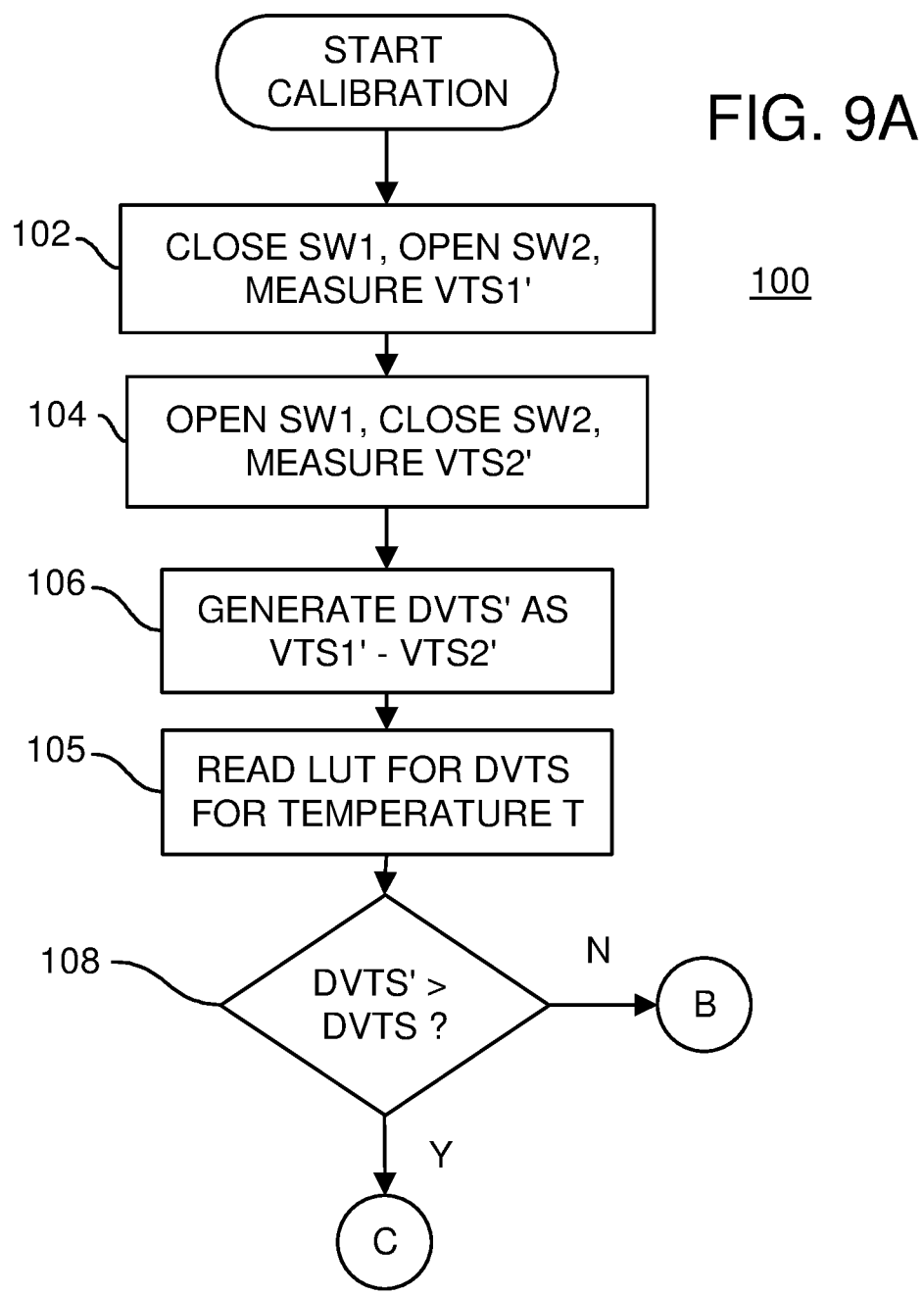
Figure 9B:
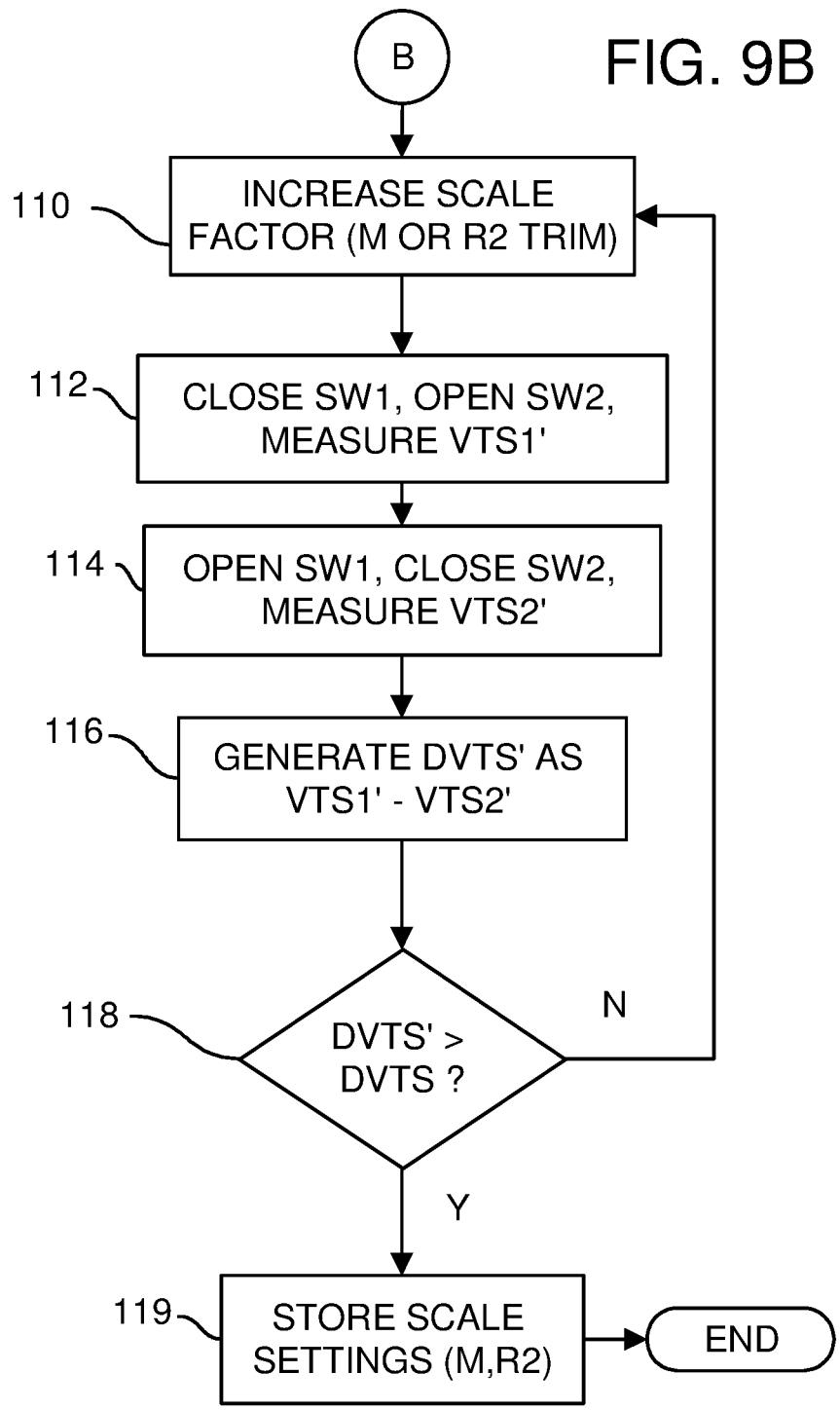

FIGS. 9A-9C are a flowchart of a calibration method for a single-temperature-point temperature sensor circuit. Calibration routine 100 can be initiated at power up, periodically, or after a temperature alarm has been triggered.

In the first measurement, step 102, switch 44 SW1 is closed and switch 42 SW2 is opened, grounding the base of PMP transistor 33 and turning it on. Both of PNP transistors 32, 33 are on. The voltage VTS on the output of the sensor circuit is sampled and stored as VTS1'.

In the second measurement, step 104, switch 44 SW1 is open and switch 42 SW2 is closed, driving high the base of PMP transistor 33 and turning it off. Only PNP transistor 32 is on, causing its emitter-to-base voltage to increase to produce a smaller current through PNP transistor 32. A lower M-times current through variable resistor 38 lowers the voltage on the sensor output, VTS, which is sampled and stored as VTS2'.

The current temperature T of the IC device is obtained, such as by measuring room temperature on an external thermometer and inputting the value into the tester. Alternately, a default value of room temperature could be used, or the testing room or environment could have its temperature controlled to a specified value. The target or ideal value of the difference, DVTS, is read from LUT 40, step 105, using the current temperature T.

The difference DVTS' between the two measured values, VTS1' and VTS2', is generated, step 106, and compared to the ideal difference DVTS, step 108.

When the measured difference DVTS' is not greater than the ideal difference DVTS, step 108, then the process continues in FIG. 9B. The scale factor is increased, step 110. Either the resistor scale factor R2/R1 is increased by increasing RR_TRIM to increase resistance R2, or the current-mirror scale factor M is increased by increasing M_TRIM.

The first measurement is repeated with the new trim values, step 112, by closing switch 44 SW1 and opening switch 42 SW2 is opened to obtain VTS1'. The second measurement is also repeated, step 114, by opening switch 44 SW1 and closing switch 42 SW2. The sensor output, VTS, is sampled and stored as VTS2'. The difference DVTS' between the two measured values, VTS1' and VTS2', is generated again, step 116, and compared to the ideal difference DVTS, step 118.

When the measured difference DVTS' is still not greater than the ideal difference DVTS, step 118, then the scale factor is increased, step 110, by increasing the resistor or current-mirror trim values. The measurement process repeats with step 112 until the measured difference DVTS' is finally greater than the ideal difference DVTS, step 118. Then the final trim values RR_TRIM and M_TRIM are stored as the scale settings, step 119, and calibration completes.

When the measured difference DVTS' is greater than the ideal difference DVTS, step 108, then the process continues in FIG. 9C. The scale factor is decreased, step 120, by decreasing one of the trim values.

The first measurement is repeated with the new trim values, step 122, by closing switch 44 SW1 and opening switch 42 SW2 is opened to obtain VTS1'. The second measurement is also repeated, step 124, by opening switch 44 SW1 and closing switch 42 SW2. The sensor output, VTS, is sampled and stored as VTS2'. The difference DVTS' between the two measured values, VTS1' and VTS2', is generated again, step 126, and compared to the ideal difference DVTS, step 128.

When the measured difference DVTS' is still not less than the ideal difference DVTS, step 128, then the scale factor is decreased again, step 120, by decreasing the resistor or current-mirror trim values. The measurement process repeats with step 112 until the measured difference DVTS' is finally less than the ideal difference DVTS, step 128. Then the final trim values RR_TRIM and M_TRIM are stored as the scale settings, step 129, and calibration completes.

Figure 10:
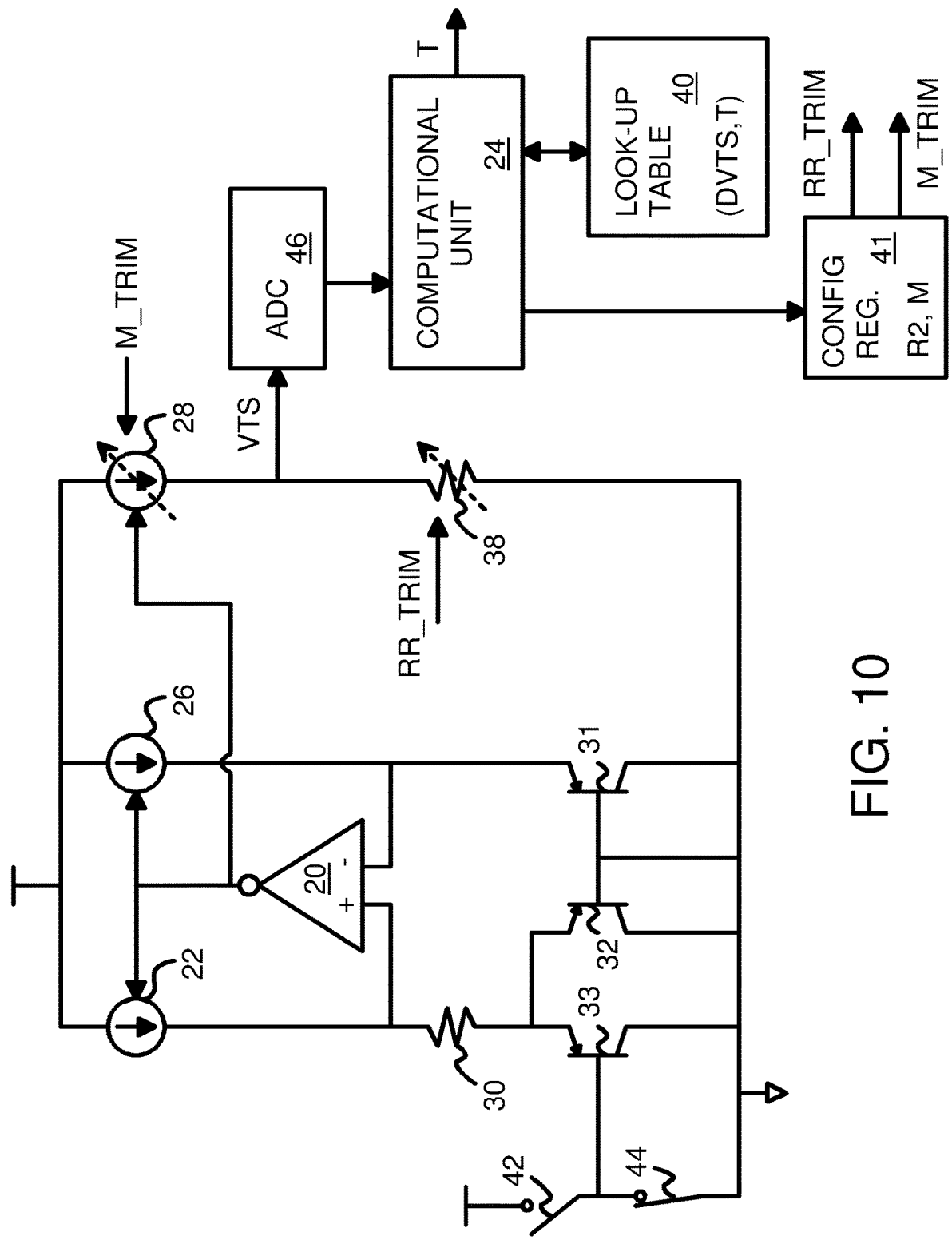
FIG. 10 shows an alternative single-temperature-point temperature sensor circuit.

FIG. 10 shows an alternative single-temperature-point temperature sensor circuit. In this alternative the output voltage VTS is applied to Analog-to-Digital Converter (ADC) 46 and converted from an analog voltage to a digital value. Computational unit 24 then stores the digital value of VTS for VTS1 and VTS2, and generates the difference in the digital values as DVTS. During normal operation, DVTS is looked up in LUT 40 to obtain the temperature T that can then be compared to temperature limits by the system.

During configuration, the trim values M_TRIM and RR_TRIM are stored in configuration register 41 and updated by computational unit 24 after the measured DVTS is compared to the target value of DVTS. The target value of DVTS can be stored in LUT 40 for each temperature, so if the testing temperature T is known, the ideal DVTS value can be obtained by a reverse lookup in LUT 40.

Figure 11:
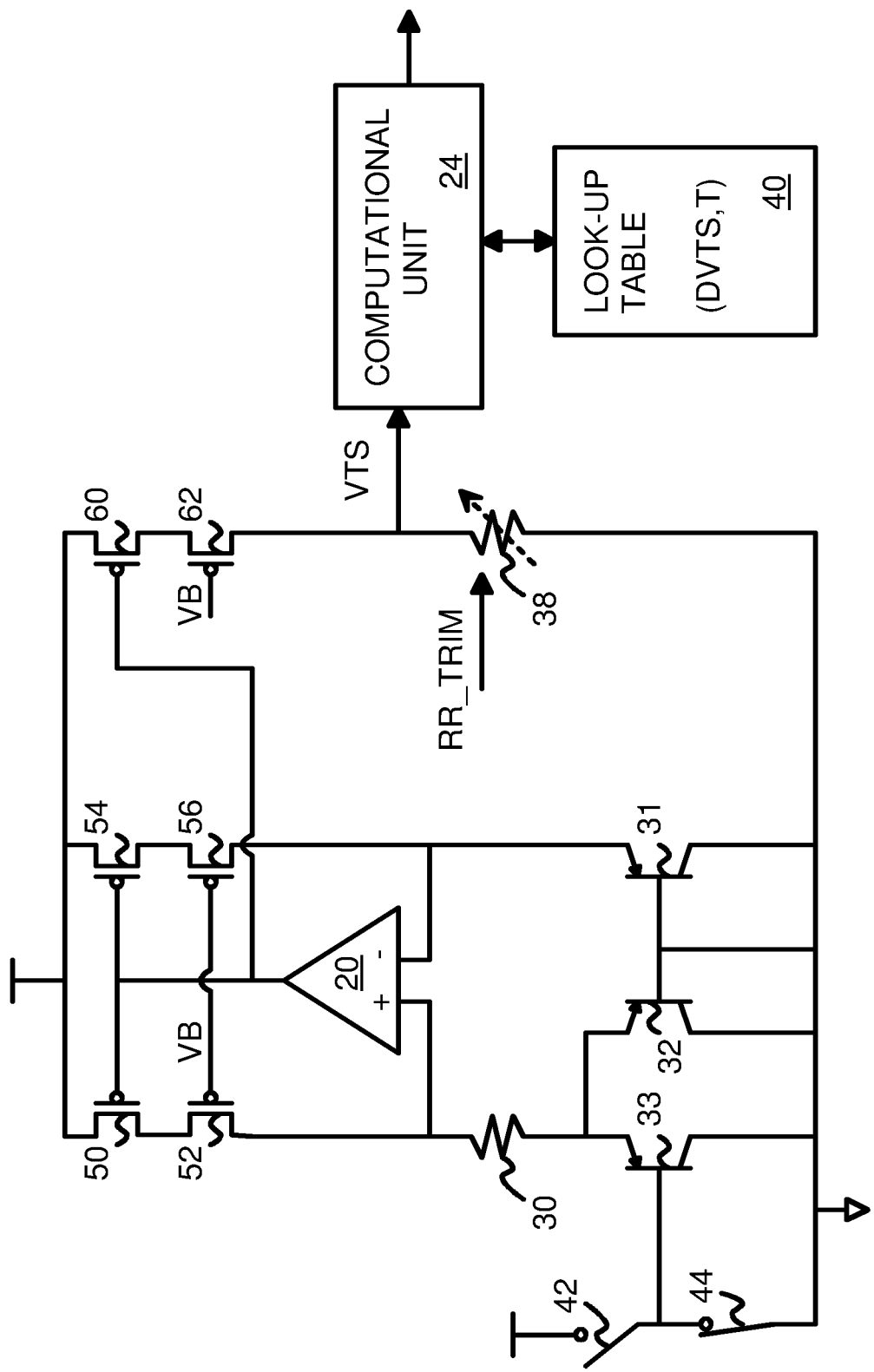
FIG. 11 is a more detailed schematic of the single-temperature-point temperature sensor circuit.

FIG. 11 is a more detailed schematic of the single-temperature-point temperature sensor circuit. Current source 22 is replaced by p-channel transistors 50, 52 in series between the power supply and the +input of error amplifier 20. Current source 26 is replaced by p-channel transistors 54, 56 in series between the power supply and the −input of error amplifier 20. Mirrored current source 28 is replaced by p-channel transistors 60, 62 in series between the power supply and the VTS output.

The non-inverting output of error amplifier 20 drives the gates of p-channel transistors 50, 54, 60. A low signal on the non-inverting output of error amplifier 20 turns on p-channel transistors 50, 54, 60.

A bias voltage VB is applied to the gates of p-channel transistors 52, 56, 62. Bias voltage VB can be generated as a intermediate voltage between the power supply voltage and ground using a ladder of transistors similar to p-channel transistors 54, 56 and PNP transistor 31. Various biasing circuits may be used. Buffering circuits may also be applied to the VTS output.

ALTERNATE EMBODIMENTS

Several other embodiments are contemplated by the inventors. For example, various physical layouts, placements, processes, and materials may be used. While voltages have been described as the signals, currents could also be used as signals.

While switches 42, 44 between power and ground have been shown to control the base of PNP transistor 33, one or more resistors could be inserted in series with switches 42, 44 to adjust the bias to the base of PNP transistor 33, or to limit current, or for other reasons. A more complex switch network could be provided to bias the base of PNP transistor 33. Switches 42, 44 could be implemented as transmission gates, transistors, muxes, or using other devices or gates. One of switches 42, 44 could be replaced with a resistor with a high resistance. For example, switch 42 could be a pull-up resistor. Then the other switch 44 would pull the base of PNP transistor 33 low, allowing the pull-up resistor to pull the base high when switch 44 was open. A single multi-pole switch that can drive the base high or low could replace switches 42, 44.

A dummy switch can be added between the base of PNP transistor 31 and ground, matching switch 44. Another dummy switch can be added between the base of PNP transistor 32 and ground, also for matching switch 44. These dummy switches can be left in the closed state to ground the bases of PNP transistors 31, 32. The bases could also be grounded through a resistor to ground rather than directly grounded.

Variable resistor 38 can be implemented using a series chain of resistors with a mux selecting a tap between adjacent resistors to select the desired overall resistance value. Several p-channel transistors in parallel may be used to implement mirrored current source 28, with M_TRIM being decoded to enable or disable various ones of the parallel transistors to obtain the desired current.

Some embodiments may only use variable resistor 38 and have a fixed mirrored current source 28, or may have more steps for RR_TRIM than for M_TRIM. The calibration routine could sequence through the whole range of RR_TRIM, and then when reaching the limit of possible RR_TRIM settings, change M_TRIM. Many other combinations are possible. Computational unit 24 could be implemented as logic gates, a hardware sequencer or state machine, or as firmware or software, or various combinations. Various formats may be used for LUT 40, and forward or reverse lookups could be provided for.

While gain factors have been presented in describing the invention, the actual factors may be more complex, and include secondary effects that the simple ratios do not precisely describe. Many second and third order circuit effects may be present and may be significant, especially for smaller device sizes. A circuit simulation may be used to account for these secondary factors during design.

Devices may be implemented using various combinations of n-channel, p-channel, or bipolar transistors, or junctions within these transistors. A capacitor could be attached to a resistance to provide an R-C filter, or more complex circuits such as active triggering circuits may be added. In some embodiments, high-voltage transistors may be used rather than low-voltage transistors with appropriate bias conditions. The gate lengths can be increased to provide better protection from damage.

Additional leaker devices such as resistors and small transistors could be added. Parasitic capacitances and resistances may be used from some components, depending on the process and device sizes used. Additional steps could be added to the calibration routine, and the order of steps may be altered. For example, VTS2 could be measured before VTS1. The target or ideal value of the difference, DVTS, could be re-read periodically from LUT 40, step 105, using the current temperature T. During normal operation, PNP transistor 33 could be disabled rather than enabled.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A single-temperature-point temperature-sensitivity sensor comprising:
    a first bipolar transistor, having a first base that controls current through the first bipolar transistor;
    a switch for controlling the first base to turn the first bipolar transistor on and off;
    a second bipolar transistor having a second base that is connected to an enabling voltage to turn on the second bipolar transistor to conduct current;
    wherein the first bipolar transistor and the second bipolar transistor are connected in parallel;
    a third bipolar transistor having a third base that is connected to an enabling voltage to turn on the third bipolar transistor to conduct current;
    a first current generator that generates a first current that flows through the second bipolar transistor when the first bipolar transistor is switched off by the switch, wherein the first current is divided to flow through both the first bipolar transistor and the second bipolar transistor in parallel when the first bipolar transistor is turned on by the switch, the first current generating a first compare voltage;
    a second current generator that generates a second current that flows through the third bipolar transistor to generate a second compare voltage;
    an error amplifier that compares the first compare voltage to the second compare voltage to generate a compare output;
    a mirrored current generator that generates a mirrored current that is a multiple of the first current, the compare output controlling the mirrored current source to adjust the mirrored current;
    a variable resistor that generates a sensor output, the mirrored current flowing through the variable resistor to generate the sensor output, the variable resistor having a resistance value that is selectable by a resistor trim control signal; and
    a controller that samples the sensor output when the switch has turned on the first bipolar transistor to obtain a first measurement, and also samples the sensor output when the switch has turned off the first bipolar transistor to obtain a second measurement, the controller generating a measurement difference of the first measurement and the second measurement,
    whereby the measurement difference is generated from measurement with the first bipolar transistor turned on and turned off.

2. The single-temperature-point temperature-sensitivity sensor of claim 1 further comprising:
    a calibration routine that activates the controller to generate the measurement difference, compares the measurement difference to a target difference, and adjusts the resistor trim control signal to better match the measurement difference to the target difference.

3. The single-temperature-point temperature-sensitivity sensor of claim 2 wherein the calibration routine repeatedly activates the controller to generate the measurement difference, compares the measurement difference to the target difference, and adjusts the resistor trim control signal to better match the measurement difference to the target difference, until the measured difference matches the target difference to within one setting of the resistor trim control signal.

4. The single-temperature-point temperature-sensitivity sensor of claim 3 wherein the first measurement and the second measurement are sampled at a same temperature.

5. The single-temperature-point temperature-sensitivity sensor of claim 4 wherein the single-temperature-point temperature-sensitivity sensor operates at a single-temperature-point during calibration;
    wherein all measurements are made at the same temperature during calibration.

6. The single-temperature-point temperature-sensitivity sensor of claim 3 further comprising:
    wherein the mirrored current generator is an adjustable current generator that generates a mirrored current that is a variable multiple of the first current, wherein the variable multiple is selectable in response to a mirror-ratio trim signal;
    wherein the calibration routine also adjusts the mirror-ratio trim signal to better match the measurement difference to the target difference.

7. The single-temperature-point temperature-sensitivity sensor of claim 3 wherein the first bipolar transistor, the second bipolar transistor, and the third bipolar transistor are PNP transistors.

8. The single-temperature-point temperature-sensitivity sensor of claim 7 wherein the switch connects the first base to a ground to turn on the first bipolar transistor;
    wherein the enabling voltage is the ground.

9. The single-temperature-point temperature-sensitivity sensor of claim 1 further comprising:
    a Look-Up Table (LUT) that stores measurement differences and corresponding temperatures, each corresponding temperature being a temperature that the measurement difference corresponds to;
    wherein during normal operation after calibration, the controller generates the measurement difference and sends the measurement difference to the LUT to read a corresponding temperature for that measurement difference, the corresponding temperature being output by the single-temperature-point temperature-sensitivity sensor as a current temperature sensed by the single-temperature-point temperature-sensitivity sensor.

10. The single-temperature-point temperature-sensitivity sensor of claim 9 further comprising:
    an Analog-to-Digital Converter (ADC) that converts the sensor output to a digital value, the digital value being sampled by the controller as the first measurement when the first bipolar transistor is turned on, and as the second measurement when the first bipolar transistor is turned off.

11. A single-temperature-point temperature-sensitivity sensor circuit comprising:
a first PNP transistor having a first base that controls current between a first emitter and a first collector;
a first switch for grounding the first base to enable the first PNP transistor, and to drive the first base to a high voltage to disable the first PNP transistor;
a second PNP transistor having a second base that is grounded to enable current between a second emitter and a second collector;
a first resistor having a first terminal and a second terminal;
wherein the first emitter and the second emitter are connected together and to the second terminal of the first resistor;
a first current source for generating a first current that flows into the first terminal of the first resistor, the first current flowing through the first resistor and into the second PNP transistor when the first switch disables the first PNP transistor, the first current flowing through the first resistor and then divided to flow through both the first PNP transistor and the second PNP transistor in parallel when the first switch enables the first PNP transistor;
a third PNP transistor having a third base that is grounded to enable current between a third emitter and a third collector;
a second current source for generating a second current with substantially a same current value as the first current, the second current flowing into the third emitter of the third PNP transistor;
an error amplifier that compares a voltage of the first terminal of the first resistor to a voltage of the third emitter of the third PNP transistor to generate a error amplifier output;
a mirrored current source, receiving the error amplifier output, for generating a mirrored current to an output node, wherein the mirrored current is a multiple of the first current;
a variable resistor connected to the output node, the variable resistor receiving a resistance trim signal to adjust a resistance of the variable resistor;
a controller that activates the first switch to enable the first PNP transistor when the output node is sampled for a first measurement, the controller activating the first switch to disable the first PNP transistor when the output node is sampled for a second measurement, the calibrator generating a measured difference of the first measurement and the second measurement;
a look-up table that receives the measured difference from the controller and outputs a temperature value, the temperature value being a sensed temperature that corresponds to the measured difference; and
a calibrator that activates the controller to generate the measured difference, compares the measured difference to a target difference for a current temperature, and adjusts the resistance trim signal to reduce a difference between the measured difference and the target difference;
wherein two measurements are made at a same temperature by enabling and disabling the first PNP transistor.

12. The single-temperature-point temperature-sensitivity sensor circuit of claim 11 wherein the first measurement and the second measurement are both made at a same temperature that corresponds to the temperature value read from the look-up table during normal operation after calibration, but the same temperature may differ from the temperature value stored in the look-up table before calibration is completed.

13. The single-temperature-point temperature-sensitivity sensor circuit of claim 12 wherein the look-up table stores a unique temperature value for each unique value of the measured difference.

14. The single-temperature-point temperature-sensitivity sensor circuit of claim 11 wherein the error amplifier output is applied to the first current source and to the second current source to control the first current and to control the second current.

15. The single-temperature-point temperature-sensitivity sensor circuit of claim 11 wherein the first collector, the second collector, and the third collector are grounded.

16. The single-temperature-point temperature-sensitivity sensor circuit of claim 11 further comprising:
a mirror-ratio trim signal, applied to the mirrored current source to adjust the mirrored current, the mirror-ratio trim signal adjusting the multiple of the first current;
wherein the mirror-ratio trim signal is adjusted by the calibrator during calibration to further reduce a difference between the measured difference and the target difference;
wherein a calibration range of measured differences that can be calibrated for is extended by the calibrator adjusting both the resistance trim signal and the mirror-ratio trim signal.

17. The single-temperature-point temperature-sensitivity sensor circuit of claim 16 wherein the first current source, the second current source, and the mirrored current source each comprise:
a first p-channel transistor and a second p-channel transistor having their channels in series, the first p-channel transistor having a source connected to a power supply and a gate receiving the error amplifier output, the second p-channel transistor having a gate receiving a bias voltage.

18. A single-temperature-point temperature-sensitivity calibration method comprising:
performing a pair of measurements by:
closing a switch to drive an enabling voltage onto a base of a first bipolar transistor in a single-temperature-point temperature-sensitivity sensor circuit;
operating the single-temperature-point temperature-sensitivity sensor circuit to generate an output voltage in a first state that is a function of a current temperature, a resistance ratio of a variable resistor to a fixed resistor, a current-mirror ratio, and a bipolar transistor current of the first bipolar transistor in parallel with a second bipolar transistor divided by a third bipolar transistor current when the switch is closed;
storing a first sample of the output voltage in the first state;
opening the switch to drive a disabling voltage onto a base of a first bipolar transistor in a single-temperature-point temperature-sensitivity sensor circuit;
operating the single-temperature-point temperature-sensitivity sensor circuit to generate the output voltage in a second state that is a function of the current temperature, the resistance ratio of a variable resistor to a fixed resistor, the current-mirror ratio, and a bipolar transistor current of the second bipolar transistor divided by a third bipolar transistor current when the switch is open;
storing a second sample of the output voltage in the second state; and
generating a measured difference between the first sample and the second sample;

comparing the measured difference to a target difference for the current temperature;

when the measured difference is greater than the target difference:

(a) decreasing the resistance ratio;

performing the pair of measurements to obtain an updated value of the measured difference;

comparing the updated value of the measured difference to the target difference for the current temperature;

when the updated value of the measured difference is still greater than the target difference, repeating from (a):

when the updated value of the measured difference is less than the target difference, storing the resistance ratio to operate the single-temperature-point temperature-sensitivity sensor circuit with a calibrated resistance ratio;

when the measured difference is less than the target difference:

(b) increasing the resistance ratio;

performing the pair of measurements to obtain an updated value of the measured difference;

comparing the updated value of the measured difference to the target difference for the current temperature;

when the updated value of the measured difference is still less than the target difference, repeating from (b):

when the updated value of the measured difference is greater than the target difference, storing the resistance ratio to operate the single-temperature-point temperature-sensitivity sensor circuit with a calibrated resistance ratio.

19. The single-temperature-point temperature-sensitivity calibration method of claim 18 further comprising:

wherein (a) decreasing the resistance ratio further comprises:

decreasing the current-mirror ratio when the resistance ratio has reached a limit.

20. The single-temperature-point temperature-sensitivity calibration method of claim 19 further comprising:

wherein (b) increasing the resistance ratio further comprises:

increasing the current-mirror ratio when the resistance ratio has reached a limit.

* * * * *